United States Patent [19]

Hartwig

[11] Patent Number: 4,665,704
[45] Date of Patent: May 19, 1987

[54] COMBUSTION ENGINE SYSTEM

[75] Inventor: Carl S. M. Hartwig, Täby, Sweden

[73] Assignee: Institut Cerac S.A., Ecublens, Switzerland

[21] Appl. No.: 774,313

[22] Filed: Sep. 10, 1985

[30] Foreign Application Priority Data

Oct. 1, 1984 [CH] Switzerland ............... 04707/84

[51] Int. Cl.$^4$ ............................................. F02G 5/02
[52] U.S. Cl. .................................. 60/597; 60/605
[58] Field of Search .................. 60/597, 598, 605, 624

[56] References Cited

U.S. PATENT DOCUMENTS

| 4,391,098 | 7/1983 | Kosuge | 60/624 X |
| 4,474,007 | 10/1984 | Kronogard et al. | 60/624 X |

FOREIGN PATENT DOCUMENTS

| 962764 | 4/1957 | Fed. Rep. of Germany | 60/624 |
| 2941240 | 4/1981 | Fed. Rep. of Germany | 60/597 |
| 214615 | 12/1983 | Japan | 60/597 |
| 192652 | 11/1937 | Switzerland | 60/598 |

*Primary Examiner*—Michael Koczo

*Attorney, Agent, or Firm*—Eric Y. Munson

[57] ABSTRACT

An internal combustion engine (11) including a turbocharger system comprising a supercharger compressor (16) connected to the intake manifold (12) of the engine driven by a first turbine (15) mounted on a common shaft (21) with the compressor and connected to the engine exhaust manifold (13). Surplus exhaust gas is passed to a second turbine (17) which drives an electric generator (18) for generating power to energize auxiliary equipment such as an electric motor (20). The loading and unloading of the generator is controlled by sensor and switch means (25, 19) in response to torque output demands, to thereby reduce the pressure ratio over the second turbine with consequent increase in back pressure and thus increase the pressure ratio over the first turbine with consequent boosting of the supercharging capacity of the compressor upon demand for increased torque output of the engine. Conversely, the pressure ratio over the first turbine is decreased and the pressure ratio over the second turbine is increased at low torque output demand, such as high engine speed, to thereby boost the generating capacity of the generator.

2 Claims, 2 Drawing Figures

COMBUSTION ENGINE SYSTEM

FIELD OF THE INVENTION

The present invention relates to a combustion engine system of the type where a turbocharger is used to feed gas to the inlet of the combustion engine. The compressor of the turbocharger is driven by a turbine which is driven by the exhaust gases of the combustion engine.

BACKGROUND OF THE INVENTION

One problem with turbocharger fed systems is that the turbocharger must be dimensioned so that the engine does not obtain too much inlet gas at normal operating speed. Because of this the engine is insufficiently charged at low operating speeds. Furthermore the exhaust gases, after the turbine, contain substantial amounts of energy. This energy is not used.

The present invention, which is defined in the appended claims, aims at improving the charging of the engine at low speeds and also to improve the use of the energy in the exhaust gases.

BRIEF DESCRIPTION OF THE DRAWINGS

Two embodiments of the invention are described below with reference to the accompanying drawing in which.

DETAILED DESCRIPTION OF THE INVENTION

Figure 1:
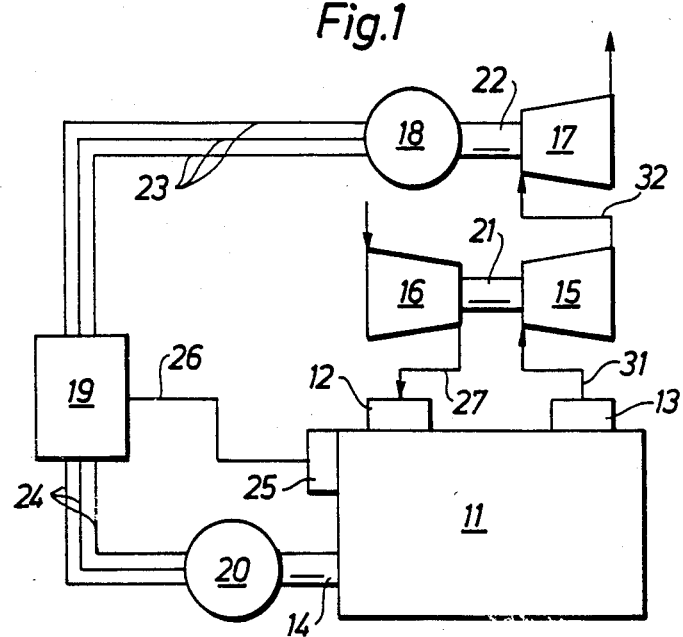
FIG. 1 shows a combustion engine system having two turbines connected in series and FIG. 2 shows a system where the turbines are connected in parallel.
Figure 2:
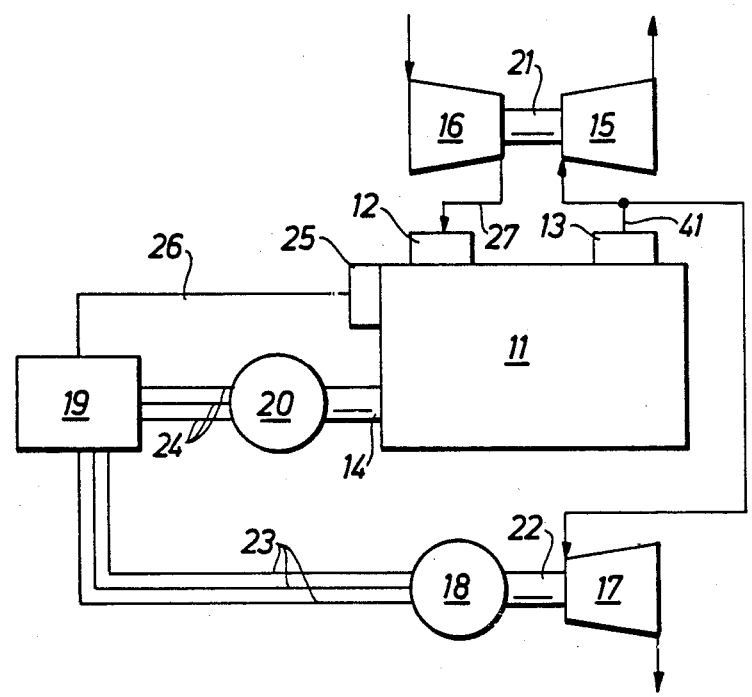

The combustion engine systems shown in the figs comprise a combustion engine 11 provided with an inlet 12 through which gas is supplied to the engine and an outlet 13 through which exhaust gases are exhausted from the engine. The engine is also provided with a crank shaft 14 for power takeoff from the engine. The power taken off from the engine can for instance be used for driving a vehicle. Gas is supplied to inlet 12 by a compressor 16 via conduit 27. The compressor is driven by a first turbine 15 via a shaft 21. First turbine 15 and a second turbine 17 are arranged to be driven by the exhaust gases from outlet 13. In the FIG. 1 embodiment the exhaust gases are fed through a conduit 31 to first turbine 15 and from there through a conduit 32 to second turbine 17. The two turbines are thus connected in series. In the FIG. 2 embodiment the exhaust gases are fed through a conduit 41 to both turbines 15 and 17 which thus are connected in parallel to the outlet of the engine. Second turbine 17 is connected by a shaft 22 to a generator 18 which via conductors 23 is connected to a controller 19 which contains switch means between the generator and an electric motor 20. The electric motor 20 which preferably could be the starter motor of the engine receives power through conductors 24 and is connected with crank shaft 14 of the engine. Sensor means 25 are arranged for sensing the operating condition of the engine and delivers control signals through conductor 26 to controller 19. Generator 18, controller 19 and the electric motor 20 together form a controlled gear transmission chain by means of which the speed ratio between second turbine 17 and electric motor 20 is adapted to the operating condition of the combustion engine.

The controlled gear transmission chain 18, 19, 20 is controlled by means of control signals obtained from sensor means 25 and delivered to controller 19. These signals could be obtained from several parameters representing the operating condition of the combustion engine. Such parameters could for instance be the speed of the engine, the pressure in inlet and outlet of the engine and the torque delivered by the engine. At low operating speeds of the combustion engine the gas flow through the engine is comparatively small which means that a large amount of the energy available in the exhaust gases should be used by the first turbine 15 so that compressor 16 is driven to deliver the amount of gas needed by the engine to give a high outgoing torque. This is in the FIG. 1 embodiment achieved by loading the generator 18 so that the speed of second turbine 17 becomes low. This leads to a low pressure ratio over second turbine 17. The pressure ratio over first turbine 15 thus becomes high whereby high power is taken out for the driving of compressor 16. When the speed of the combustion engine becomes higher second turbine 17 is allowed to run faster. This speed is controlled by controller 19 by loading generator 18 so that compressor 16 delivers the amount of gas necessary for efficient operation of the combustion engine. When second turbine 17 runs at a higher speed its efficiency becomes higher so that the power delivered to generator 18 becomes substantial. This power is transferred via controller 19 to the electric motor 20 which could be an induction motor of the squirrel cage type directly connected with the crank shaft 14 of the combustion engine 11. The electric motor is preferably the starter motor of the engine. In the FIG. 2 embodiment the pressure ratio across first turbine 15 is kept high at low operating speeds of the combustion engine through letting second turbine 17 run a high speed. In order to keep this speed high second turbine 17 should not be loaded. At higher engine speeds the speed of second turbine 17 is decreased by loading generator 18. The power generated is transferred via controller 19 to electric motor 20 whereby power from the exhaust gases is transferred to the crank shaft 14 of combustion engine 11.

The controlled transmission chain could instead of the shown electric transmission comprise a hydraulic transmission or a mechanical gear box. The hydraulic transmission would then comprise a pump of variable capacity driven by the second turbine and a hydraulic motor connected with the crank shaft. If a mechanical gear box is used it should be possible to shift between at least two gear ratios.

What is claimed is:

1. In an internal combustion engine (11) having an intake manifold (12), an exhaust manifold (13) and a power takeoff shaft (14), a turbocharging system comprising:
    (a) a supercharger compressor (16) connected to the intake manifold of the engine for delivering thereto a supercharged fuel charge;
    (b) a first turbine (15) connected to the exhaust manifold of the engine and mounted on a common shaft (21) with said compressor;
    (c) a second turbine (17) driven by surplus exhaust gas from said first turbine;
    (d) an electric generator (18) driven by said second turbine (17) for energizing auxiliary equipment connected to said engine;
    (e) regulator means (19) for controlling the output of said generator;

(f) sensor means (25) for sensing the torque output demands of said engine and connected to said regulator means (19); and (g) said regulator means (19) being responsive to said sensor means (25) to regulate the load on said generator to increase the back pressure on said second turbine (17) upon increased torque output demand to thereby boost the supercharging capacity of said first turbine (15) and said compressor (16) and upon reduced torque output demand to decrease the back pressure on said second turbine (17) to thereby boost the generating capacity of said generator (18).

2. An internal combustion engine according to claim 1, in which said auxiliary equipment comprises an electric motor (20) connected to said power takeoff shaft (14).

* * * * *